G. R. WILLIAMS.
Clock Calendar Movements.

No. 142,829. Patented September 16, 1873.

Witnesses.

Inventor.

UNITED STATES PATENT OFFICE.

GEORGE R. WILLIAMS, OF ITHACA, NEW YORK.

IMPROVEMENT IN CLOCK-CALENDAR MOVEMENTS.

Specification forming part of Letters Patent No. 142,829, dated September 16, 1873; application filed March 18, 1873.

*To all whom it may concern:*

Be it known that I, GEORGE R. WILLIAMS, of Ithaca, Tompkins county, New York, have invented an Improvement in Calendar-Clock Machinery, of which the following is a specification:

This invention is designed to simplify the machinery connecting the time with the calendar movements in calendar-clocks, and accomplishes this purpose by the use of a peculiarly-shaped cam, which is attached directly to the hour-hand axle of the clock. This cam is shown in—

Figure 1:
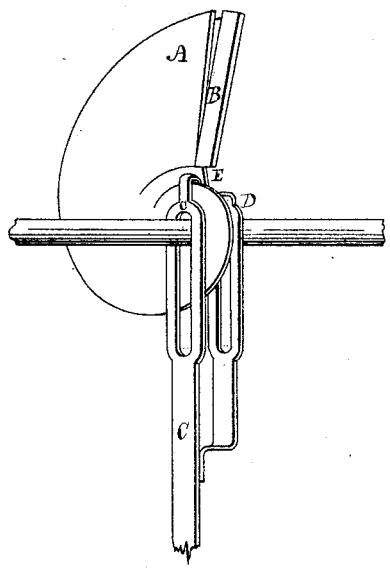
Figure 3:
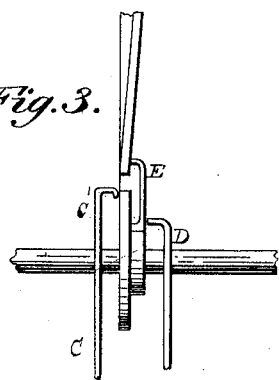
Figure 2:
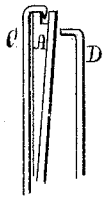

Figure 1, which is a full view of the improvement, with drop-lever represented as at the close of one revolution of the cam. Fig. 2 shows the position of lever just before dropping. Fig. 3 shows same just after dropping.

A, Fig. 1, is a cam-wheel, formed with an inclined surface, B, which throws the drop C off at the side of the wheel at each dropping, as shown in Fig. 3. The cam then makes one revolution without lifting the drop. Toward the close of this revolution the arm D of the drop, pressing against the curved wedge-shaped projection E on the cam, draws the hook of the drop into the groove, as shown in Fig. 1, following which, as the cam revolves, it takes its edge, and is thereby lifted until it reaches the position at A, Fig. 2, ready to drop. This cam, being attached to the axle of the hour-hand of the clock, makes two revolutions in twenty-four hours, but lifts the drop-lever only at each alternate revolution, so producing the motion required for the calendar machinery.

I claim—

1. The cam A, with incline B and wedge-shaped projection E, in combination with the drop or detaching rod C, with hook C' and arm D, for the purpose of making one trip or fall of the rod C in twenty-four hours, when the cam A is fast to the twelve-hour shaft of the clock, as set forth.

2. The cam A, with incline B and wedge-shaped projection E, in combination with the drop or detaching rod C, with hook C', when operated by or on any suitable shaft or part of the clock-movement, when constructed substantially as described.

GEO. R. WILLIAMS.

Witnesses:
WM. G. KING,
H. S. WILLIAMS.